United States Patent [19]

Hosoya et al.

[11] Patent Number: 4,974,221
[45] Date of Patent: Nov. 27, 1990

[54] METHOD AND APPARATUS FOR REPRODUCING INFORMATION BY VARYING A SENSITIVITY OF A PHASE-LOCKED LOOP IN ACCORDANCE WITH A DETECTION STATE OF A REPRODUCED SIGNAL

[75] Inventors: Hideki Hosoya, Kawasaki; Hiroshi Inoue, Tokyo, both of Japan

[73] Assignee: Canon Kabushiki Kaisha, Tokyo, Japan

[21] Appl. No.: 220,795

[22] Filed: Jul. 13, 1988

[30] Foreign Application Priority Data

Jul. 17, 1987 [JP] Japan .................................. 62-179667
Jul. 23, 1987 [JP] Japan .................................. 62-182315

[51] Int. Cl.⁵ ............................................. G11B 7/00
[52] U.S. Cl. ............................ 369/44.32; 369/44.35; 369/44.34
[58] Field of Search ...................... 369/44, 46, 43, 59, 369/54; 360/51

[56] References Cited

U.S. PATENT DOCUMENTS

| | | | |
|---|---|---|---|
| 4,495,474 | 1/1985 | Nishikawa et al. | 369/59 |
| 4,587,644 | 5/1986 | Fujiie | 369/54 |
| 4,685,098 | 8/1987 | Yoshida | 369/59 |
| 4,700,334 | 10/1987 | Shinkai | 369/54 |
| 4,737,866 | 4/1988 | Ebata | 360/51 |
| 4,809,253 | 2/1989 | Baas et al. | 369/54 |

*Primary Examiner*—Donald McElheny, Jr.
*Attorney, Agent, or Firm*—Fitzpatrick, Cella, Harper & Scinto

[57] ABSTRACT

This invention relates to an information reproducing method and apparatus in which a phase locked loop (PLL) circuit produces a clock signal from a reproduced signal and includes a sensitivity varying mechanism. The sensitivity of the PLL circuit is increased or decreased relative to when a tracking error signal is low or high, respectively. Further, if the reproduced signal drops, the frequency and phase of the clock signal are held. Then, immediately after the reproduced signal is regained and the hold is released, the sensitivity of the PLL circuit is lowered to a value less than that prior to the drop in the reproduced signal.

22 Claims, 5 Drawing Sheets

METHOD AND APPARATUS FOR REPRODUCING INFORMATION BY VARYING A SENSITIVITY OF A PHASE-LOCKED LOOP IN ACCORDANCE WITH A DETECTION STATE OF A REPRODUCED SIGNAL

BACKGROUND OF THE INVENTION

1. Field of the Invention

The present invention relates to method and apparatus for reproducing information recorded on a recording medium, and more particularly, to a method and apparatus for reproducing information by using a phase-locked loop which generates a clock signal from a reproduced signal.

2. Related Background Art

Various information recording media, such as a disk, card and tape which record and reproduce information have been known in the art. Of those, a card-shaped optical information recording medium (hereinafter referred to as an optical card) is expected to have a big demand as a compact, light weight, easy-to-carry and large capacity information recording medium.

When digital record information is to be reproduced from such a medium, it is necessary to generate a clock signal (reproducing clock) to demodulate data from the reproduced signal. The clock signal is usually generated by a phase-locked loop (PLL) based on the reproduced signal.

FIG. 1 shows a block diagram of a conventional PLL circuit. Such a circuit includes a phase comparator 1, a lowpass filter 2 and a voltage controlled oscillator 3, connected in a series circuit. An output of the voltage controlled oscillator 3 is fed back to the phase comparator 1, which compares the reproduced signal from the recording medium (not shown) with the output of the voltage controlled oscillator 3 to produce a voltage output representing a phase difference therebetween. The low-pass filter (LPF) 2 passes only a low frequency component of the output of the phase comparator 1 and supplies it to the voltage controlled oscillator (VCO) 3. The VCO generates an output signal at a frequency corresponding to the output voltage of the LPF 2, as a reproducing clock.

The PLL circuit feeds the output signal of the VCO 3 back to the phase comparator 1 to control the VCO 3 such that the frequency and phase of the output signal of the VCO 3 are always equal to the frequency and phase of the reproduced signal, which is the input signal to the PLL circuit.

Assuming that transfer functions of the phase comparator 1, LPF 2 and VCO 3 are $K_p$, $G$ and $K_{vco}/S$, respectively, a circulation transfer function $G_o$ of the PLL circuit is expressed by $$G_o = K_p \cdot G \cdot K_{vco}/S$$

It is important to determine a value of the transfer function $G_o$.

If a gain or cutoff frequency of the function $G_o$ is high, the sensitivity of the PLL is high and the PLL may follow a variation in the frequency and phase of the detected signal. For example, when a transport velocity of the recording medium includes many jitters and the frequency and phase of the detected signal vary significantly, the PLL can follow the variation. On the other hand, if the sensitivity of the PLL is high, auto-tracking may be disabled by a defect, such as a scratch or dust on the recording medium so that asynchronization may readily take place when the reproduced signal drops.

On the other hand, if the gain or cutoff frequency of the transfer function $G_o$ is low to lower the sensitivity of the PLL, the PLL cannot follow the jitter and asynchronization may readily take place, but the PLL is less sensitive to the defect, such as a scratch and dust, on the recording medium.

In the conventional information reproducing apparatus, the gain or cutoff frequency of the transfer function $G_o$ which determines the sensitivity of the PLL circuit is fixed to a value inherent to the apparatus. Accordingly, it is difficult to set the sensitivity of the PLL circuit to solve both problems of jitter and the drop of the reproduced signal. In the information reproducing apparatus which uses an optical card, the optical card is reciprocally moved. As a result, an impact at the reversal adversely affects the tracking control. Thereby, the drop of the reproduced signal and asynchronization readily take place.

An apparatus for reproducing information which holds the tracking signal when the reproduced signal drops is disclosed in Japanese Laid-Open Patent Application No. 59-142757. When the above sample/hold technique is applied to the PLL circuit, a configuration shown in FIG. 2 is formed. In FIG. 2, like elements to those shown in FIG. 1 are designated by like numerals and detailed explanation thereof is omitted.

The circuit of FIG. 2 differs from the circuit of FIG. 1 in that a reproduced signal drop detector 4, which detects the drop of the reproduced signal to generate a data drop signal $S_1$, and a sample/hold (S/H) circuit 5 connected between the LPF 2 and the VCO 3 for supplying the output of the LPF 2 to the VCO 3 in a normal state, but sampling and holding the output of the LPF 2 when the data drop signal $S_1$ is generated, are added.

When the reproduced signal drops, a residual phase error of the PLL generally increases with time in accordance with the circulation transfer function $G_o$ of the PLL. When the residual phase error reaches 180 degrees ($\pi$), asynchronization of the PLL takes place. The lower the gain of the transfer function $G_o$ is and the lower the cutoff frequency is, the longer is the time period in which the residual phase error reaches 180 degrees. Accordingly, it is desirable to lower the gain of the transfer function $G_o$ and the cutoff frequency in order to avoid adverse influence of a defect such as a scratch and dust, but when they are lowered, the PLL cannot follow the jitter and the asynchronization may take place.

In FIG. 2, the gain of the transfer function $G_o$ and the cutoff frequency are set sufficiently high, Thereby, the PLL can follow the jitter, and when the reproduced signal drops, the output of the LPF 2 is sampled and held by the S/H circuit 5, having a sufficiently long hold time constant, to fix the input voltage to the VCO 3 to a level which almost causes the drop of the reproduced signal accordingly, that the output frequency and phase of the VCO 3 are fixed to avoid asynchronization of the PLL circuit In FIG. 2, if the dropped reproduced signal is recovered, the data drop signal $S_1$ transits immediately after recovery of the signal (depending on the response characteristic of the reproduced signal drop detector 4). Acccordingly, holding by the S/H circuit 5 is released at that moment and the PLL circuit controls the phase error at that moment be rendered zero.

Critical factors in this case are the sensitivity of the PLL circuit and the sampled and held value, that is, a difference between the phase error at the time of drop of the signal and the phase error at the time of recovery of the signal.

Since the phase error at the time of drop of the signal and the phase error at the time of recovery of the signal are totally independent from each other, if the difference is large, the input to the VCO 3 changes stepwise. When the sensitivity of the PLL is high, the response characteristic includes, more or less, an overshoot. Accordingly, if there is a big change in the phase error, so that the input to the VCO 3 changes stepwise, the PLL may be asynchronized at the time of recovery of the signal due to the response characteristic.

SUMMARY OF THE INVENTION

It is an object of the present invention to provide a method and apparatus for reproducing information which prevent asynchronization of a PLL circuit when frequency and phase of a reproduced signal are varied by jitter and when the reproduced signal drops and recovers due to a defect on a recording medium, such as a scratch and dust.

The above object is achieved by varying a sensitivity of the PLL circuit in accordance with a detection status of the reproduced signal from the recording medium. In one embodiment of the present invention, the sensitivity of the PLL circuit is increased or decreased when a tracking error signal is low or high. Accordingly, when the tracking signal is high and the reproduced signal is apt to drop, the sensitivity of the PLL circuit is low and asynchronization due to the drop of the reproduced signal is difficult to occur.

In another embodiment of the present invention, if the reproduced signal drops, frequency and phase of a clock signal are held and the sensitivity of the PLL circuit immediately after the release of the hold, when the reproduced signal is recovered, is kept lower than before the drop of the reproduced signal As a result, the asynchronization due to an abrupt change in the input signal, when the hold is released, is prevented.

DETAILED DESCRIPTION OF THE PREFERRED EMBODIMENTS

Figure 1:
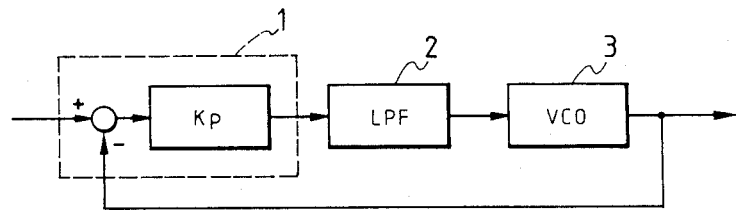
FIG. 1 shows a block diagram of a conventional PLL circuit used in an information reproducing apparatus, FIG. 2 show a block diagram of the PLL circuit of FIG. 1 with a sample/hold circuit being added.
Figure 2:
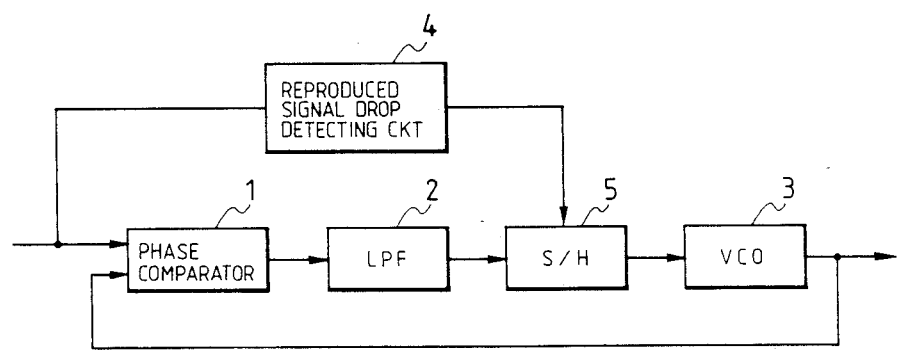
Figure 3:
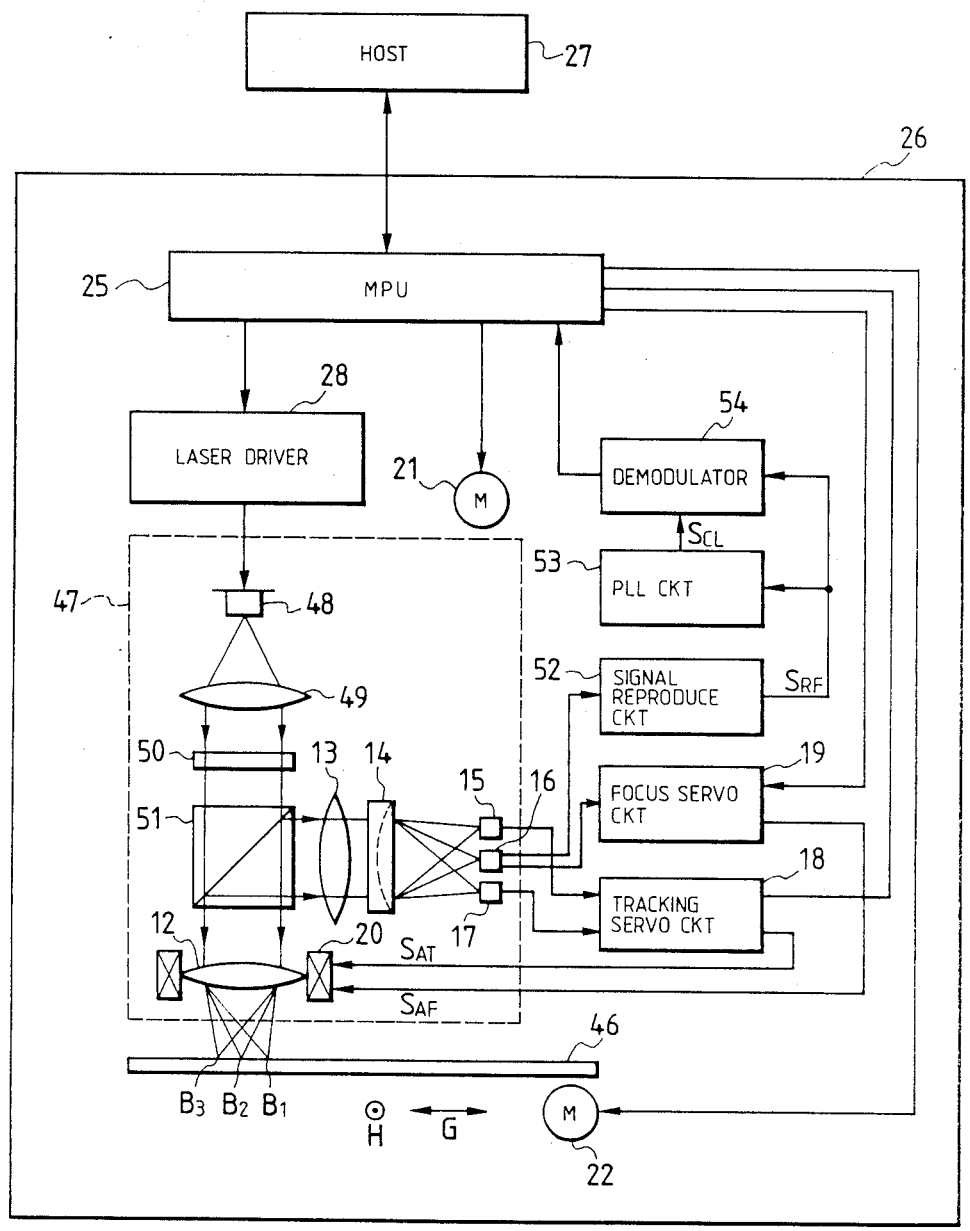
FIG. 3 shows a configuration of an information reproducing apparatus of the present invention.

FIG. 3 shows a block diagram of one embodiment of an information reproducing apparatus of the present invention. In the present embodiment, an optical card 46 is used as a recording medium. A light beam is irradiated to the optical card 46 by an optical head 47. It is emitted from a semiconductor laser 48 mounted in the optical head 47. The light emitted from the semiconductor laser 48 is collimated by a collimator lens 49 and it is split into three beams by a diffraction grating 50. The split beams pass through a beam splitter 51 and form light spots $B_1$, $B_2$ and $B_3$ on the optical card 46 through are objective lens 12. Reflected lights of those light spots are reflected by the beam splitter 51, pass through a condenser lens 13 and a cylindrical lens 14 and are detected by photo-detectors 15, 16 and 17, respectively. Outputs of the photo-detectors 15 and 17 are supplied to a tracking servo circuit 18 which produces a tracking error signal $S_{AT}$. A focus servo circuit 19 produces a focusing error signal $S_{AF}$ based on the output of the photo-detector 16. Those signals are supplied to a lens actuator 20 which drives the objective lens 12 along an optical axis and normally to the optical axis to effect focusing control and tracking control, respectively. The output of the photo-detector 16 is also applied to a signal reproducing circuit 52 which produces a reproduced signal $S_{RF}$. The reproduced signal $S_{RF}$ is applied to a PLL circuit 53 and a demodulator 54. The PLL circuit 53 produces a clock signal $S_{CL}$ based on the reproduced signal $S_{RF}$ and sends it to the demodulator 54, which demodulates the data from the reproduced signal by using the clock signal $S_{CL}$. The demodulated data is sent to a host computer 27 connected to the external of a drive unit 26 through a microprocessing unit (MPU) 25.

The sesmiconductor laser 48 is driven by a laser drive 28 connected to the MPU 25. The optical head 47 which contains the actuator 20 is moved by a stepping motor 21 in a direction H normal to the plane of the drawing. On the other hand, the optical card 46 is driven in a direction indicated by double-head arrow G by a motor 22. A basic configuration of the information reproducing apparatus which uses the optical card is disclosed in U.S. patent application Ser. Nos. 812,995 and 33,789.

Figure 4:
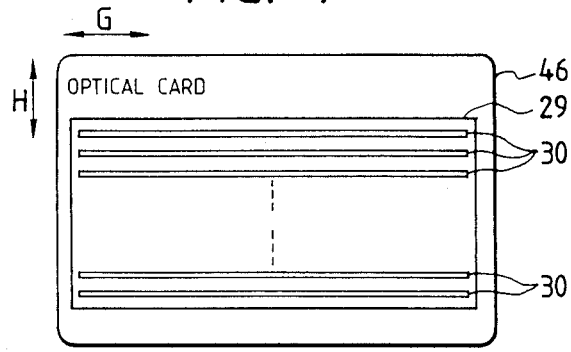
FIG. 4 shows a plan view of an optical card used in the apparatus of FIG. 3.

FIG. 4 is a plan view of the optical card 46, which comprises a substrate made of plastics having a recording layer of silver halide, dye or calcogen formed thereon. A plurality of parallel tracking tracks 30 which are optically detectable by unevenness or different reflection factors are formed on the recording layer 29. Those tracking tracks 30 are arranged at a constant pitch and recording areas for recarding information are formed between the tracking tracks.

Figure 5:
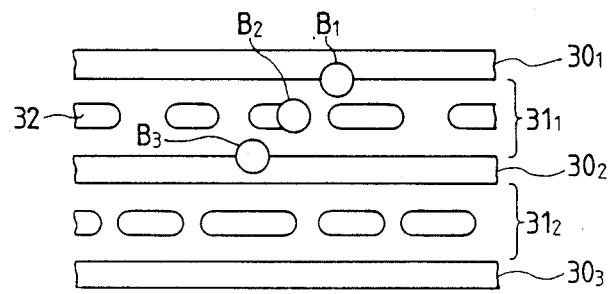
FIG. 5 shows an enlarged view of a recording area of the optical card.
Figure 6:
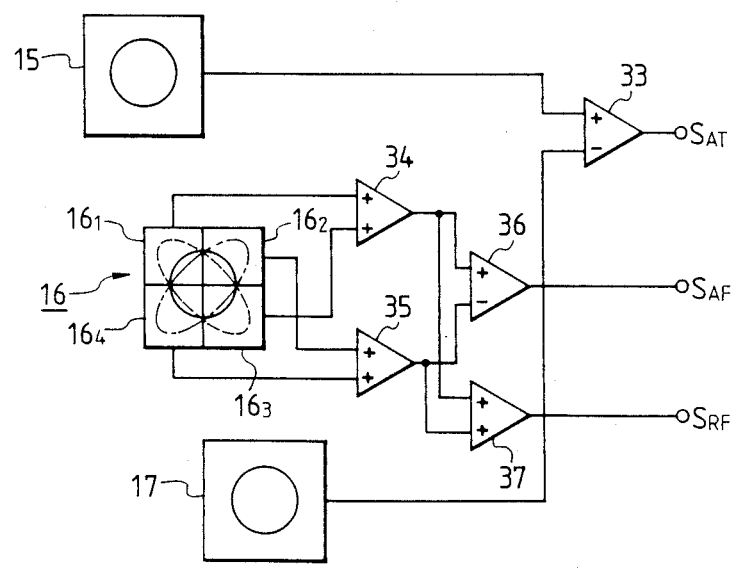
FIG. 6 shows a configuration of a signal detector in the apparatus of FIG. 3.

FIG. 5 shows an enlarged view of a recording surface of the optical card 46, and FIG. 6 shows specific circuits of the signal reproducing circuit, tracking servo circuit and focus servo circuit in the apparatus of FIG. 3. In FIG. 5, there are recording areas $31_1$ and $31_2$ between the tracking tracks $30_1$ and $30_2$, and $30_2$ and $30_3$. The beam spots $B_1$ and $B_3$ are irradiated such that portions thereof overlie on the tracking tracks $30_1$ and $30_2$, and the beam spot $B_2$ is irradiated to the recording area $31_1$. When the irradiation positions of the beam spots $B_1$–$B_3$ deviate normally to the track, there occurs an unbalance between the intensity of the reflected beam from the spot $B_1$ and the intensity of the reflected beam from the spot $B_3$. As shown in FIG. 6, the output of the photo-detectors 15 and 17 which detect the lights from the spots $B_1$ and $B_3$ are differentiated by a differential amplifier 33 which produces the tracking error signal $S_{AT}$ which indicates the amount and direction of the deviation. Auto-tracking control is effected based on the tracking error signal so that the beam spot $B_2$ is precisely guided to the recording area between the tracking tracks. A sum of all portions $16_1$–$16_4$ of the photo-detector 16 which receives the reflected light from the spot $B_2$ is calculated by adders 34, 35 and 37 to produce the reproduced signal $S_{RF}$. When the information recorded in the recording area $31_2$ is to be reproduced, the beam spots $B_1$, $B_2$ and $B_3$ are irradiated to the tracking track $30_1$, recording area $31_2$ and tracking track $30_2$, respectively.

On the other hand, focusing servo is conducted by an astigmatism method. The reflected light from the spot on the card is imparted with an astigmatism by a cylindrical lens 14 shown in FIG. 3. Accordingly, if a light detected by the photo-detector defocuses along an optical axis, the shape thereof is flattened, as shown by broken line and chain line in FIG. 6. Accordingly, of the four divided areas of the photo-detector 16, a sum of the areas $16_1$ and $16_3$ and a sum of the areas $16_2$ and $16_4$ are calculated by the adders 34 and 35, respectively, and a difference between those sums is produced by the differential amplifier 36 to produce the focusing signal $S_{AF}$.

Figure 7:
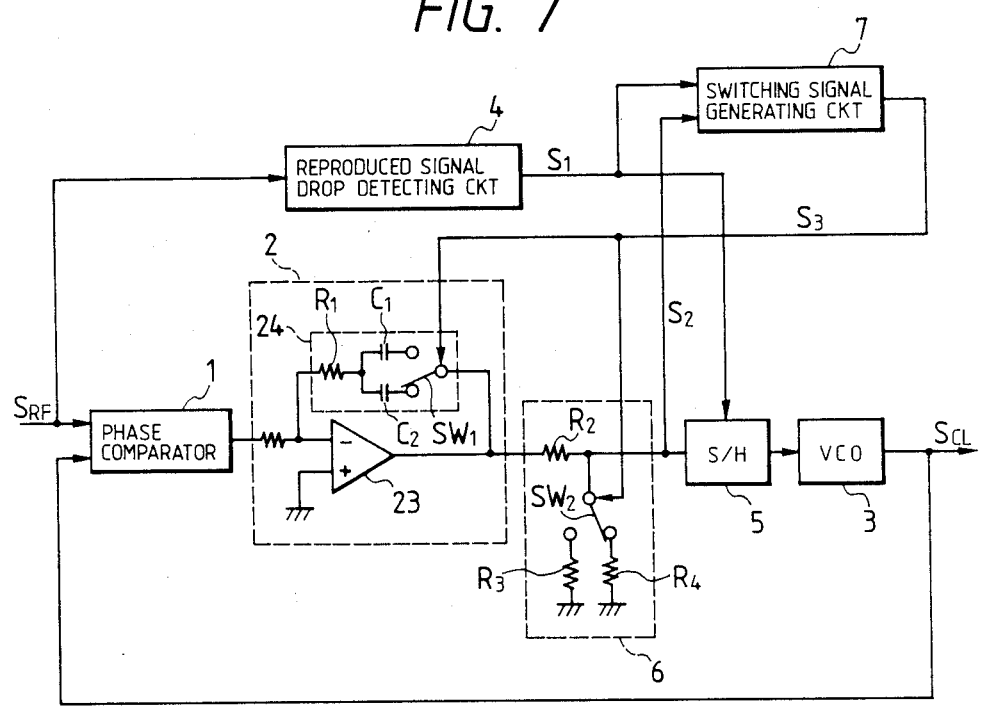
FIG. 7 shows a block diagram of one embodiment of a PLL circuit used in the apparatus of FIG. 3.

FIG. 7 shows a block diagram of one embodiment of a PLL circuit used in the information reproducing apparatus of FIG. 3.

The PLL circuit of the present invention comprises a phase comparator 1, an LPF 2 and a VCO 3, as well as a reproduced signal drop detector 4, which detects the drop of the reproduced signal $S_{RF}$ to produce a drop signal $S_1$, an attenuator (ATT) 6 connected between the LPF 2 and the VCO 3, an S/H circuit 5, and a switching signal generator 7 for producing a switching signal $S_3$ to switch the sensitivity of the PLL.

The LPF 2 comprises an operational amplifier 20 for operating the output of the phase comparator 1 and a feedback circuit 21 for feeding back the output of the operational amplifier 20. The feedback circuit 21 comprises a resistor $R_1$, capacitors $C_1$ and $C_2$ and a first switch $SW_1$. When the switch $SW_1$ is connected to capacitor $C_2$ as shown, the cutoff frequency of the LPF 2 is high (time constant is small).

The ATT 6 comprises three resistors $R_2$, $R_3$ and $R_4$ and a second switch $SW_2$. The resistances of the resistors $R_2$–$R_4$ are selected such that attenuation is low when the switch $SW_2$ is connected to $R_4$ as shown.

The switches $SW_1$ and $SW_2$ are switched by a switching signal $S_3$ to be described later so that the sensitivity of the PLL is controlled.

The S/H circuit 5 supplies the output of the ATT 6, that is, the output of the LPF 2 to the VCO 3 when the drop signal $S_1$ is low level, and when the drop signal $S_1$ is high level, the output of the LPF 2 immediately after the high level, is sampled and supplied to the VCO 3. The hold time constant of the S/H circuit 5 is set sufficiently long and the sensitivity of the PLL circuit is set so that the PLL circuit can follow the variation in the frequency and phase of reproduced signal.

Figure 8:
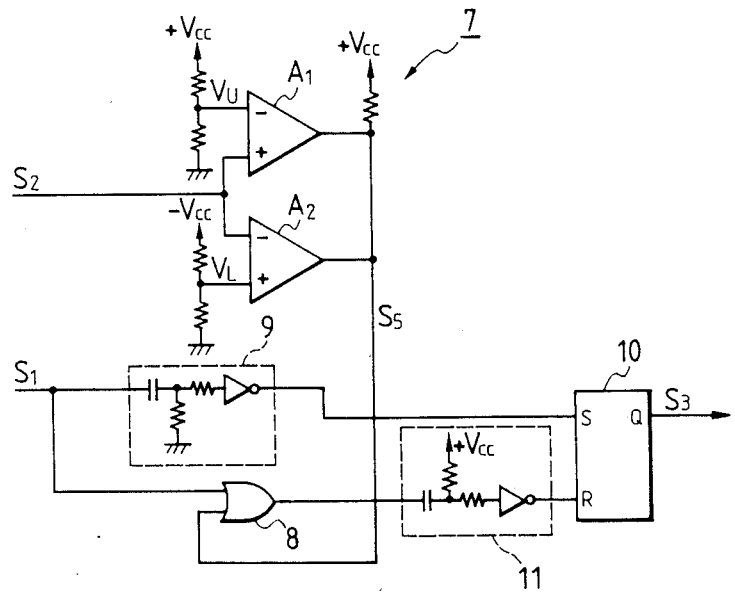
FIG. 8 shows a configuration of a switching signal generator shown in FIG. 7, and FIGS. 9 and 10 show other embodiments of the PLL circuit used in the apparatus of FIG. 3.

FIG. 8 shows a circuit diagram of the switching signal generator 7.

Comparators $A_1$ and $A_2$ have the outputs thereof wired-ORed, and form a window comparator which produces a low level comparator output $S_5$ when the output $S_2$ of the ATT 3 applied to the input is between a lower threshold level $V_L$, and an upper threshold level $V_U$, which are constants determined by resistor-division of power supplies $-V_{CC}$ and $+V_{CC}$. The width of the window $V_U$–$V_L$ is appropriately selected in consideration of the response characteristic of the PLL.

The comparator output $S_5$ is supplied to one input of a logical OR circuit 8. The drop signal $S_1$ which is high level while the reproduced signal drops, is applied to the other input of the OR circuit 8. A differentiation circuit 9 comprises an inverter, a capacitor and a resistor and produces a signal at a falling edge of the input signal. The falling edge of the drop signal $S_1$ is extracted by the differentiation circuit 9 and is applied to a set terminal of a flip-flop (FF) circuit 10. The output signal of the OR circuit 8 is supplied to a reset terminal of the FF circuit 10 through a falling differentiation circuit 11 for producing a signal at a falling edge of the input signal.

A Q-output of the FF circuit 10 is applied to the LPF 2 and the ATT 6 as a switching signal $S_3$ to switch the switches $SW_1$ and $SW_2$ in order to control the sensitivity of the PLL.

The reproduced signal drop detector 4 detect the drop by integrating the reproduced signal for comparison. While the reproduced signal is read, the integrated value is within a predetermined range. When the reproduced signal drops, the integrated value is lower than the predetermined range. Accordingly, the drop of the reproduced signal can be detected by comparing the integrated value with a lower level of the range.

The operation is now explained. At the start of the operation, the FF circuit 10 is cleared by an initialization circuit (not shown), and when the reproduced signal is read normally, the data drop signal $S_1$ and the sample/hold signal $S_3$ are of low level. Accordingly, the PLL circuit, comprising the phase comparator 1, LPF 2 and VCO 3, operates normally When the reproduced signal drops, it is detected by the reproduced signal drop detector 4 so that the data drop signal $S_1$ assumes the high level. Thus, the output of the ATT 6 which has been applied to the input of the VCO 3 is sampled and held by the S/H circuit 5 and it is applied to the VCO 3. As a result, the output of the VCO 3, that is, the frequency and phase of the clock signal $S_{CL}$ are held and the PLL circuit can prevent asynchronization due to the drop of the reproduced signal.

When the reproduced signal recovers, the data drop signal $S_1$ returns to the low level and the holding by the S/H circuit 5 is released. The data drop signal $S_1$ is differentiated at the falling edge by the differentiation circuit 9 to set the FF circuit 10. As a result, the switching signal $S_3$ which is the output of the FF circuit 10 assumes the high level, and the switches $SW_1$ and $SW_2$ of the LPF 2 and the ATT 6 are switched to the capacitor $C_1$ and the resistor $R_3$, respectively, from the positions shown. Accordingly, the cutoff frequency of the LPF 2 is relatively lowered and the attenuation of the ATT 6 is relatively increased. As a result, the sensitivity of the PLL circuit is relatively lowered so that the asynchronization of the PLL circuit, at the time of recovery of the reproduced signal due to an overshoot of the response characteristic of the PLL, is prevented.

Then, the PLL control is effected under a low sensitivity state. As the phase error reduces and the output of the ATT 6, that is, the output $S_2$ of the LPF 2 comes between the thresholds $V_1$ and $V_2$, the comparator output $S_5$ assumes the low level. As a result, the output signal of the OR circuit 8 also assumes the low level and the falling edge is extracted by the differentiation circuit 11 and the FF circuit 11 is reset by the falling signal. Accordingly, the switching signal $S_3$ which is the Q output returns to the low level. As a result, the switches $SW_1$ and $SW_2$ return to the positions shown and the cutoff frequency of the LPF 2 is relatively raised and the attenuation of the ATT 6 is relatively reduced. Accordingly, the sensitivity of the PLL circuit again rises and the jitter-insensitive control is effected.

In the present embodiment, the output of the LPF 2 is sampled and held in order to hold the frequency and phase of the reproduced clock: when the reproduced signal drops, although it may be sampled and held anywhere in the loop, as long as the same effect is attained. The circuit shown in FIG. 8 is a mere example and any equivalent circuit may be used instead.

In the present embodiment, the cutoff frequency of the LPF 2 and the attenuation of the ATT 6 are simultaneously switched by the switching signal $S_3$ in order to switch the sensitivity of the PLL circuit, although only either one of them may be switched. The transfer functions (sensitivities) of the phase comparator 1 and the VCO 3 may be switched to change the circulation transfer function Go of the PLL so that the sensitivity of the PLL is switched. In this case, the same effect may be attained.

In accordance with the information recording apparatus of the present invention, the sensitivity of the PLL circuit is set high so that the asynchronization due to the variation of the frequency and phase of the reproduced signal by the jitter of the velocity of the recording medium can be reduced. When the signal drops due to a defect, such as a scratch or dust, the frequency and phase of the reproducing clock is held to the level which exhibits immediately after the drop of the reproduced signal, so that the asynchronization of the PLL circuit is prevented. When the reproduced signal recovers, the holding is released while the sensitivity of the PLL is switched low, and when the phase error comes into the predetermined range, the sensitivity of the PLL circuit is returned to the relatively high state so that the asynchronization of the PLL circuit, at the time of signal recovery due to the response characteristic of the PLL circuit, is prevented.

Figure 9:
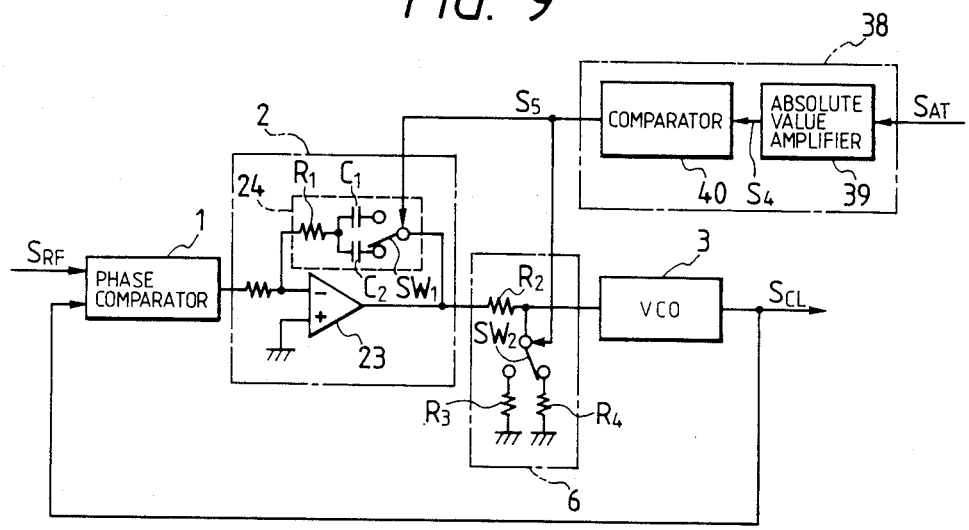

FIG. 9 shows a block diagram of another embodiment of the PLL circuit used in the information reproducing apparatus of FIG. 3. Like elements to those shown in FIG. 7 are designated by like numerals. The tracking error signal $S_{AT}$ from the tracking servo circuit 18 is applied to the PLL circuit.

In the PLL circuit of the present embodiment, the phase comparator 1, LPF 2, VCO 3 and ATT 6 connected between the LPF 2 and the VCO 3 are identical to those shown in FIG. 7, and a switching signal generator 38 for generating a switching signal to switch the sensitivity of the PLL circuit is additionally provided.

The switching signal generator 38 amplifies an absolute value of the tracking error signal $S_{AT}$ supplied from the tracking servo circuit 18 of FIG. 3, by an absolute value amplifier 39, which amplifies the tracking error signal $S_{AT}$ as it is when the polarity thereof is positive, and amplifies the inverted signal when the polarity thereof is negative. The amplified signal $S_4$ is compared with a reference by a comparator, and when it is larger than the reference, a high level switching signal $S_5$ is produced. The switches $SW_1$ and $SW_2$ are switched by the switching signal $S_5$ to control the sensitivity of the PLL.

The operation is now explained. When the switching signal $S_5$ is at the low level, that is, when the absolute value of the AT error signal $S_{AT}$ is small, the switches $SW_1$ and $SW_2$ are connected to the positions shown in FIG. 9. The cutoff frequency of the LPF 2 is thus relatively high and the attenuation of the ATT 6 is relatively low. As a result, the sensitivity of the PLL circuit is relatively high.

If, by some reason, a positional relationship between the light spot and the information track significantly varies and the absolute value of the tracking error signal $S_{AT}$ exceeds the reference level of the comparator 40, the switching signal $S_5$ assumes the high level and the switches $SW_1$ and $SW_2$ are switched from the positions shown in FIG. 9 to the capacitor $C_1$ and the resistor $R_3$, respectively, so that the cutoff frequency of the LPF 2 is relatively lowered and the attenuation of the ATT 6 is relatively increased. As a result, the cutoff frequency of the circulation transfer function Go of the PLL circuit is lowered, the gain thereof is also reduced and the sensitivity of the PLL circuit is reduced. Accordingly, the asynchronization of the PLL circuit is difficult to occur, for the drop of the reproduced signal.

In the present embodiment, the cutoff frequency of the LPF 2 and the attenuation of the ATT 6 are simultaneously switched by the switching signal $S_5$, although only either one of them may be switched.

In the present embodiment, the sensitivity is switched in two steps, although it may be switched in any number of steps.

The transfer functions of the phase comparator and the VCO 3 may be switched to change the circulation transfer function Go of the PLL in order to switch the sensitivity of the PLL. In this case, the same effect is attained.

Figure 10:
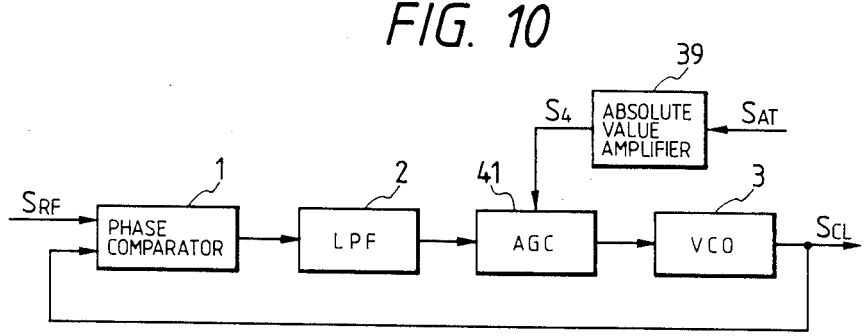

FIG. 10 shows a block diagram of a further embodiment of the PLL circuit used in the information reproducing apparatus of the present invention. In the present embodiment, the sensitivity of the PLL circuit can be continuously varied in accordance with the magnitude (absolute value) of the tracking error signal.

In the present embodiment, an automatic gain controller (AGC) 41 is connected between the LPF 2 and the VCO 3 so that the amplification factor thereof is continuously varied in accordance with the absolute value signal $S_4$ which is the output of the absolute value amplifier 39.

The circuit is designed such that a product $A \cdot G_A$ is constant, when A is the absolute value of the tracking error signal $S_{AT}$ or the magnitude of the absolute value signal $S_4$, and $G_A$ is a gain of the circulation transfer function of the PLL circuit. Thus, the sensitivity of the PLL circuit is controlled such that the sensitivity of the PLL circuit to the drop of the reproduced signal is always substantially constant, irrespective of the absolute value of the tracking error signal.

In the present embodiment, the gain of the circulation transfer function of the PLL circuit is controlled. Alternatively, the cutoff frequency of the LPF 2 may be continuously varied by the AGC in accordance with the absolute value signal $S_4$. In this case, the control is effected such that a product $A \cdot f_A$ is constant, where $f_A$ is the cutoff frequency of the circulation transfer function of the PLL circuit, so that the sensitivity of the PLL circuit to the drop of the reproduced signal is always substantially constant, irrespective of the absolute value of the tracking error signal. The gain and the cutoff frequency may be simultaneously controlled.

The present invention is not limited to the illustrated embodiments, but various modifications may be made. For example, the present invention is applicable cable not only to an optical card apparatus but also to an information reproducing apparatus which uses a disk or tape recording medium.

The present invention includes all of those variations, without departing from the scope of claims.

What is claimed is:

1. An information reproducing apparatus comprising:
   means for reproducing a signal from an information recording medium;
   a phase locked loop circuit for producing a clock signal from the reproduced signal, said phase locked loop circuit having a sensitivity level;
   drop detection means for detecting a drop in the reproduced signal, wherein said phase locked loop circuit has a first sensitivity level prior to a drop in the reproduced signal;
   holding means for holding the frequency and phase of the clock signal when the reproduced signal drops and releasing means for releasing the hold when the reproduced signal recovers; and
   means for varying the sensitivity level of the phase locked loop such that the sensitivity level is lower than the first level immediately after the hold for the clock signal has been released by said releasing means and the sensitivity is raised to the first sensitivity level when a residual phase error of the phase locked loop is within a predetermined range.

2. An information reproducing apparatus according to claim 1, wherein said means for varying the sensitivity level comprises means for varying gain of a circulation transfer function of the phase locked loop.

3. An information reproducing apparatus according to claim 1, wherein said means for varying the sensitivity level comprises means for varying a cutoff frequency of a circulation transfer function of the phase locked loop.

4. An information reproducing apparatus according to claim 1, wherein said phase locked loop circuit comprises a phase comparator for comparing phases of the reproduced signal and the clock signal, a low pass filter for passing a low frequency component of the output of said phase comparator, and a voltage controlled oscillator for producing a clock signal in accordance with the output of said low pass filter.

5. An information reproducing apparatus according to claim 4, wherein said means for varying the sensitivity level comprises an attenuator connected between said low pass filter and said voltage controlled oscillator and having switchable attenuation, and a circuit for generating a switching signal for said attenuator in accordance with the output signal of said attenuator and the output signal of said drop detection means.

6. An information reproducing apparatus according to claim 5, wherein said low pass filter has a cutoff frequency thereof switchable by the switching signal.

7. An information reproducing apparatus according to claim 5, wherein said switching signal generator circuit comprises a window comparator for comparing the output signal of said attenuator with predetermined upper and lower limits, an OR circuit for ORing the output signal of said window comparator and the output of said drop detection means, and a flip-flop circuit having a set terminal thereof connected to the output of said drop detection means and a reset terminal thereof connected to the output of said OR circuit for producing the switching signal.

8. An information reproducing apparatus according to claim 1, wherein said means for reproducing the signal comprises means for irradiating a light beam to the information recording medium, a photo-detector for detecting reflected light of the light beam from the medium, and a signal reproducing circuit connected to said photo-detector.

9. An information reproducing apparatus according to claim 1, further comprising a demodulator for demodulating a data signal from the reproduced signal by using the clock signal.

10. An information reproducing method comprising the steps of:
    reproducing a signal from an information recording medium;
    generating a clock signal from the reproduced signal by a phase locked loop circuit having a sensitivity level;
    holding the frequency and phase of the clock signal when the reproduced signal drops, the phase locked loop having a first sensitivity level prior to a drop in the reproduced signal;
    lowering the sensitivity level of the phase locked loop circuit lower than the first level when the reproduced signal recovers for releasing the hold of the clock signal; and
    raising the sensitivity level of the phase locked loop circuit to the first level when a residual phase error of the phase locked loop circuit is within a predetermined range after releasing the hold.

11. An information reproducing apparatus comprising:
    means for reproducing a signal from an information recording medium and means for detecting a tracking error signal;
    a phase locked loop circuit for generating a clock signal from the reproduced signal; and
    means for varying a sensitivity of said phase locked loop circuit at a high level and a low level, relative to when the tracking error signal is at a low level and a high level, respectively.

12. An information reproducing apparatus according to claim 11, wherein said means for varying the sensitivity comprises means for varying gain of a circulation transfer function of said phase locked loop circuit.

13. An information reproducing apparatus according to claim 11, wherein said means for varying the sensitivity comprises means for varying a cutoff frequency of a circulation transfer function of said phase locked loop circuit.

14. An information reproducing apparatus according to claim 11, wherein said phase locked loop circuit comprises a phase comparator for comparing phases of the reproduced signal and the clock signal, a low pass filter for passing a low frequency component of the output of said phase comparator, and a voltage controlled oscillator for producing a clock signal in accordance with the output of said low pass filter.

15. An information reproducing apparatus according to claim 14, wherein said means for varying the sensitivity comprises an attenuator connected between said low pass filter and said voltage controlled oscillator and having switchable attenuation, and a circuit for generating a switching signal for said attenuator in accordance with the tracking error signal.

16. An information reproducing apparatus according to claim 15, wherein said low pass filter has a cutoff frequency thereof switchable by the switching signal.

17. An information reproducing apparatus according to claim 15, wherein said switching signal generator comprises an absolute value amplifier for producing a signal proportional to an absolute value of the input tracking error signal and a comparator for producing, as a switching signal, a comparison output resulting from comparison of the output of said absolute value amplifier and a reference.

18. An information reproducing apparatus according to claim 11, wherein said means for varying the sensitivity comprises an absolute value amplifier for producing a signal proportional to an absolute value of the input tracking error signal and an automatic gain controller provided in said phase locked loop for continuously varying a gain thereof in accordance with the output of said absolute value amplifier.

19. An information reproducing apparatus according to claim 18, wherein said automatic gain controller comprises means for controlling the gain such that a product of the output of said absolute value amplifier and a gain of a circulation transfer function of said phase locked loop circuit is constant.

20. An information reproducing apparatus according to claim 11, wherein said means for reproducing the signal and means for detecting the tracking error signal comprise means for irradiating a light beam to the information recording medium, a photo-detector for detecting reflected light of the light beam from the medium, and a tracking servo circuit and signal reproducing circuit connected to said photo-detector.

21. An information reproducing apparatus according to claim 11, further comprising a demodulator for demodulating a data signal from the reproduced signal by using the clock signal.

22. An information reproducing method comprising the steps of:
reproducing a signal from an information recording medium and detecting a tracking error signal;
generating a clock signal from the reproduced signal by a phase locked loop circuit; and
varying a sensitivity of the phase locked loop circuit at a high level and a low level, relative to when the tracking error signal is at a low level and a high level, respectively.

* * * * *

UNITED STATES PATENT AND TRADEMARK OFFICE
CERTIFICATE OF CORRECTION

PATENT NO. : 4,974,221

DATED : November 27, 1990

INVENTOR(S) : Hideki Hosoya, et al.

It is certified that error appears in the above-identified patent and that said Letters Patent is hereby corrected as shown below:

COLUMN 1

Line 18, "tape" should read --tape,--.

COLUMN 2

Line 53, "high," should read --high.--;
    Line 59, "signal accordingly," should read --signal. Accordingly,--;
    Line 61, "circuit" should read --circuit.--; and
    Line 68, "moment be" should read --moment to be--.

COLUMN 3

Line 40, "signal" should read --signal.--.

COLUMN 4

Line 52, "card 46," should read --card 46--; and
    Line 61, "normally" should read --normal--.

COLUMN 5

Line 54, "LPF 2" should read --LPF 2,--;
    Line 58, "the" (third occurrence) should be deleted; and
    Line 59, "of" should read --of the--.

COLUMN 6

Line 21, "detect" should read --detects--.

UNITED STATES PATENT AND TRADEMARK OFFICE
CERTIFICATE OF CORRECTION

PATENT NO. : 4,974,221

DATED : November 27, 1990

INVENTOR(S) : Hideki Hosoya, et al.

It is certified that error appears in the above-identified patent and that said Letters Patent is hereby corrected as shown below:

COLUMN 7

Line 11, "clock:" should read --clock--; and
  Line 58, "$S_{AT}$supplied" should read --$S_{AT}$ supplied--.

COLUMN 8

Line 31, "comparator" should read --comparator 1--; and
  Line 55, "constant." should read --constant,--.

COLUMN 9

Line 3, "cable" should be deleted; and
  Line 4, "apparatus" should read --apparatus,--.

COLUMN 11

Line 18, "phase locked loop" should read --phase locked loop circuit--.

Signed and Sealed this

Fourth Day of August, 1992

Attest:

DOUGLAS B. COMER

*Attesting Officer*  *Acting Commissioner of Patents and Trademarks*